(12) United States Patent
Redekop

(10) Patent No.: US 9,839,171 B2
(45) Date of Patent: Dec. 12, 2017

(54) AGRICULTURAL LAND ROLLER IMPLEMENT

(71) Applicant: Johan Redekop, Winkler (CA)

(72) Inventor: Johan Redekop, Winkler (CA)

( * ) Notice: Subject to any disclaimer, the term of this patent is extended or adjusted under 35 U.S.C. 154(b) by 328 days.

(21) Appl. No.: 13/826,712

(22) Filed: Mar. 14, 2013

(65) Prior Publication Data

US 2014/0262376 A1    Sep. 18, 2014

(51) Int. Cl.
*A01B 29/02* (2006.01)
*A01B 73/06* (2006.01)

(52) U.S. Cl.
CPC ............ *A01B 29/02* (2013.01); *A01B 73/067* (2013.01)

(58) Field of Classification Search
CPC .............................. A01B 73/067; A01B 29/02
USPC ................................................... 172/311, 286
See application file for complete search history.

(56) References Cited

U.S. PATENT DOCUMENTS

| | | | | |
|---|---|---|---|---|
| 62,822 | A | * | 3/1867 | Crowe .......................... 404/125 |
| 3,545,033 | A | * | 12/1970 | Couser ............................ 16/370 |
| 3,672,701 | A | * | 6/1972 | Blank ........................ 280/414.5 |
| 3,880,241 | A | * | 4/1975 | Vincent ........................... 172/311 |
| 4,127,283 | A | * | 11/1978 | Baden ............................ 172/248 |
| D258,657 | S | * | 3/1981 | Stark ............................... D15/27 |
| 4,360,215 | A | * | 11/1982 | Nohl et al. ..................... 280/413 |
| 6,561,283 | B2 | * | 5/2003 | Hundeby ........................ 172/459 |
| 8,291,994 | B2 | * | 10/2012 | Hulicsko ........................ 172/311 |
| 8,820,428 | B2 | * | 9/2014 | McCrea et al. ................ 172/170 |
| 2008/0314605 | A1 | | 12/2008 | Degelman et al. | |
| 2010/0307780 | A1 | | 12/2010 | Hulicsko | |
| 2011/0265699 | A1 | | 11/2011 | McCrea et al. | |

FOREIGN PATENT DOCUMENTS

GB              2110061 A  *  6/1983  ............. A01B 63/22

OTHER PUBLICATIONS

Summers Manufacturing Company, Inc., SuperRoller brochure, printed in 2010, Devils Lake and Maddock ND 58348; website: www.summersmfg.com.

* cited by examiner

*Primary Examiner* — Thomas B Will
*Assistant Examiner* — Joel F. Mitchell
(74) *Attorney, Agent, or Firm* — Ryan W. Dupuis; Ade & Company Inc.

(57) ABSTRACT

A land roller implement includes a main frame section, two intermediate frame sections extending laterally outward from opposing sides of the main frame section in a trailing relationship therewith in a working position, and a pair of outer frame sections extending laterally outward from respective intermediate frame sections in a leading relationship therewith in the working position. The outer frame sections are coupled to the intermediate frame sections by readily removable outer brace portions to reduce the transport width if required. Inner brace members are coupled between the main frame section and the intermediate frame sections by coupling to the outer brace portions at the outer ends and by pivoting on the main frame section about a floating axis which is coaxial with floating movement of the intermediate frame sections relative to the main frame section.

19 Claims, 11 Drawing Sheets

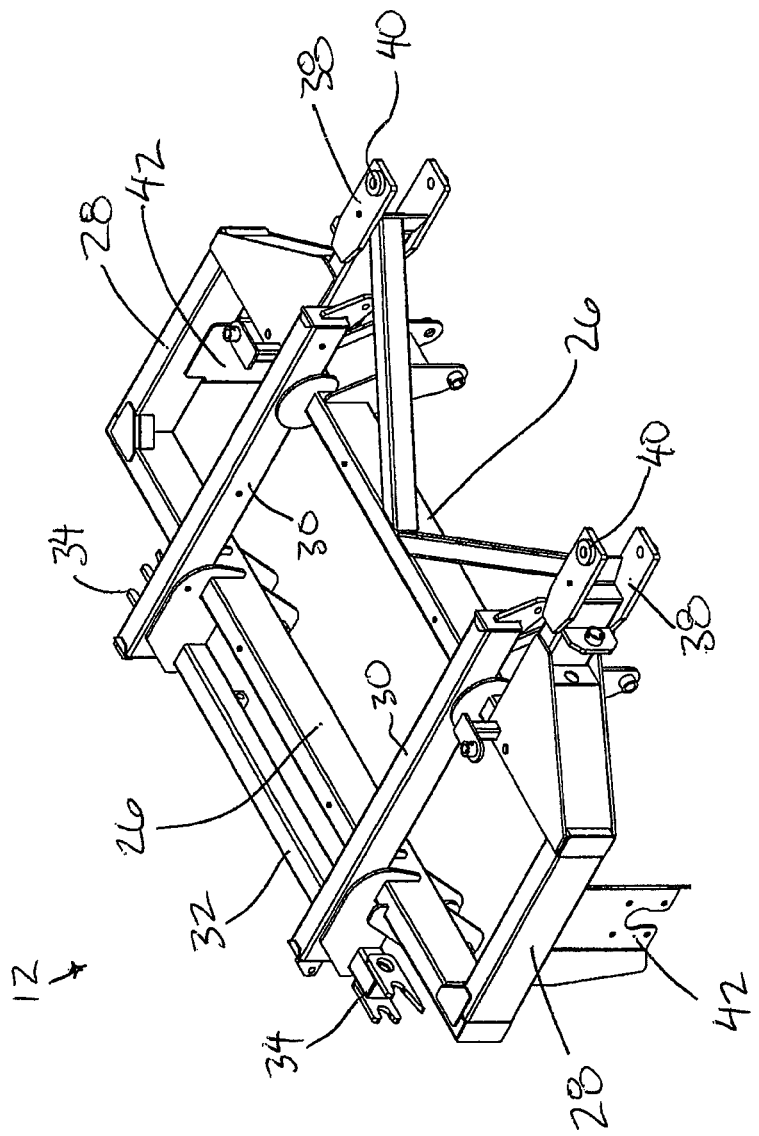

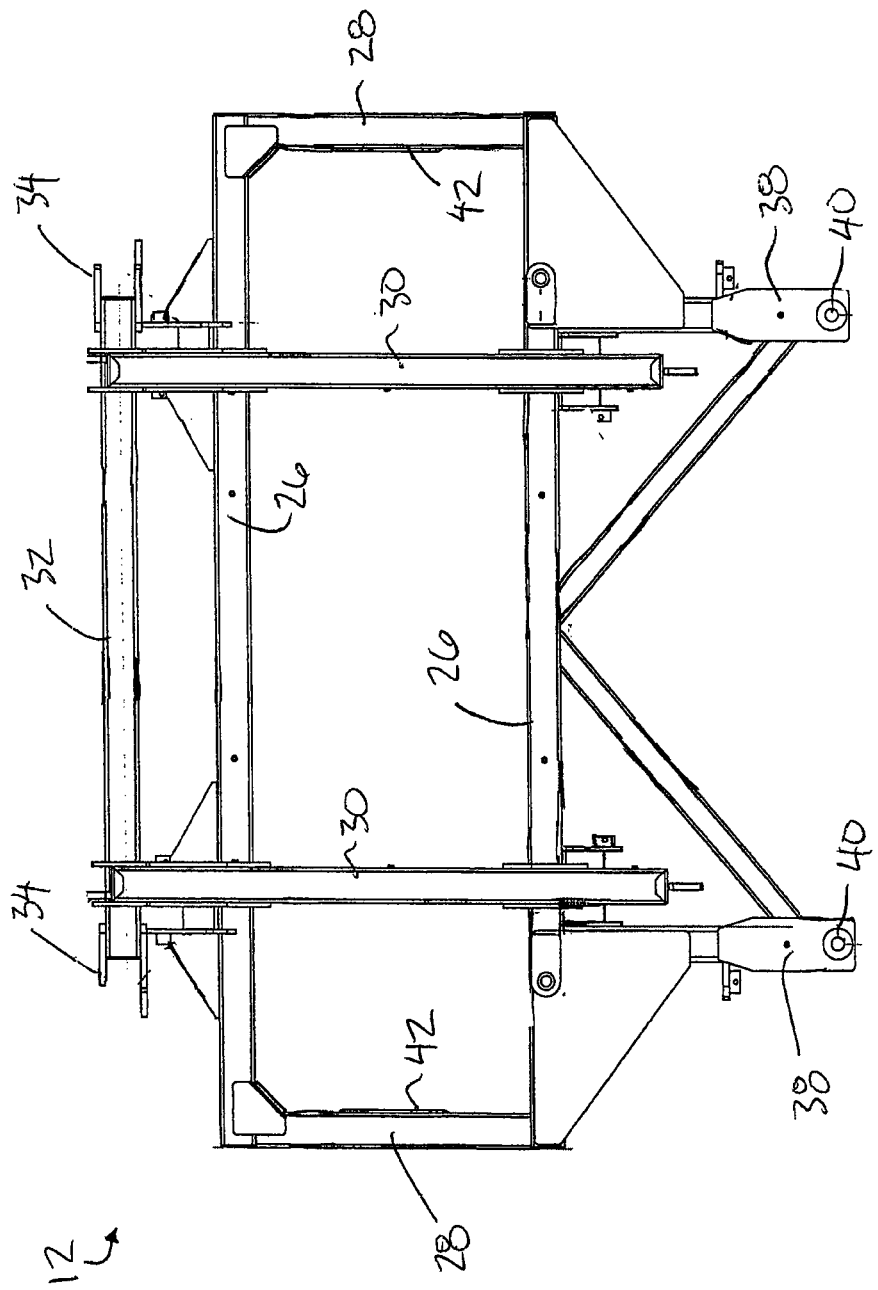

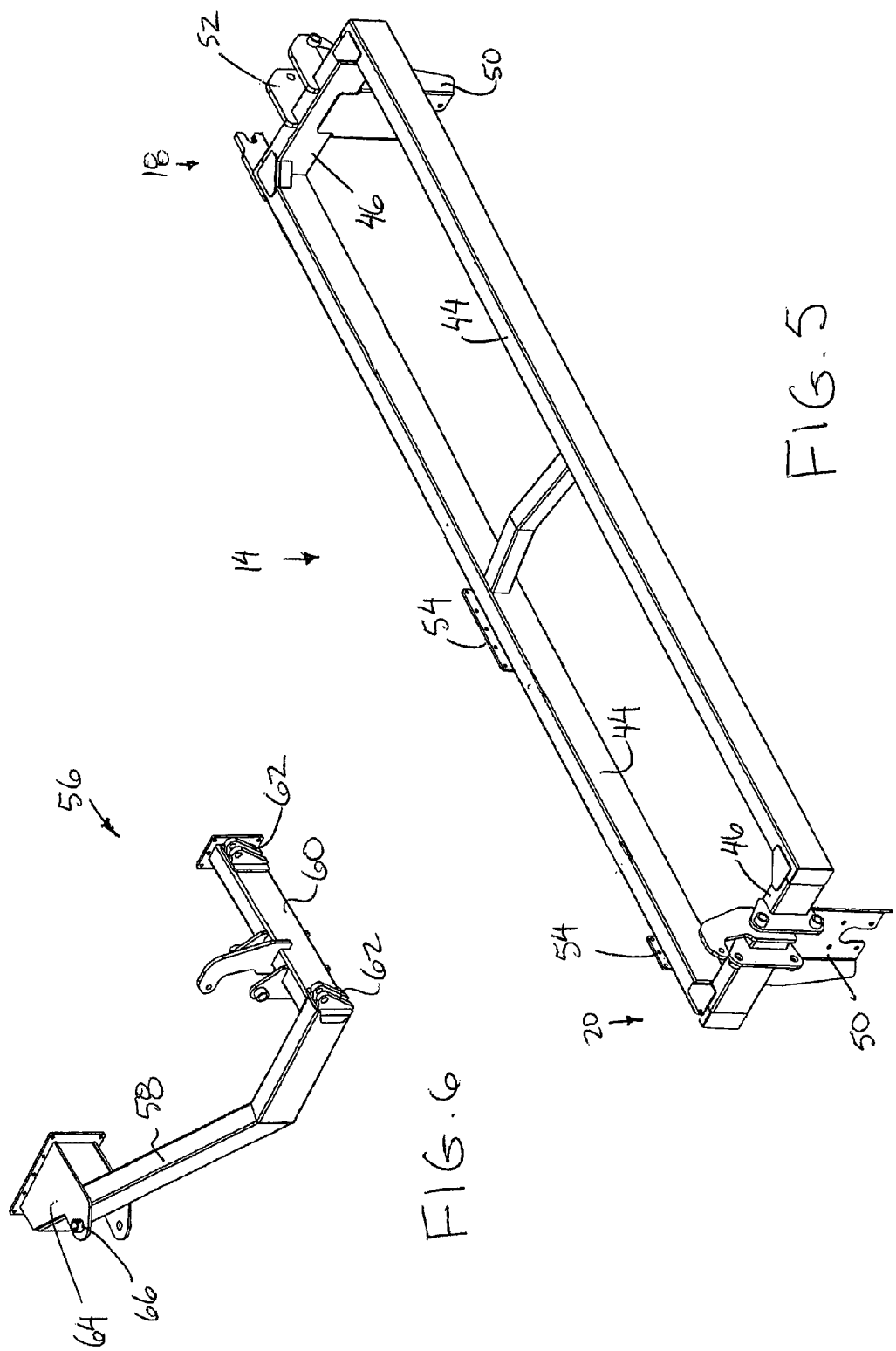

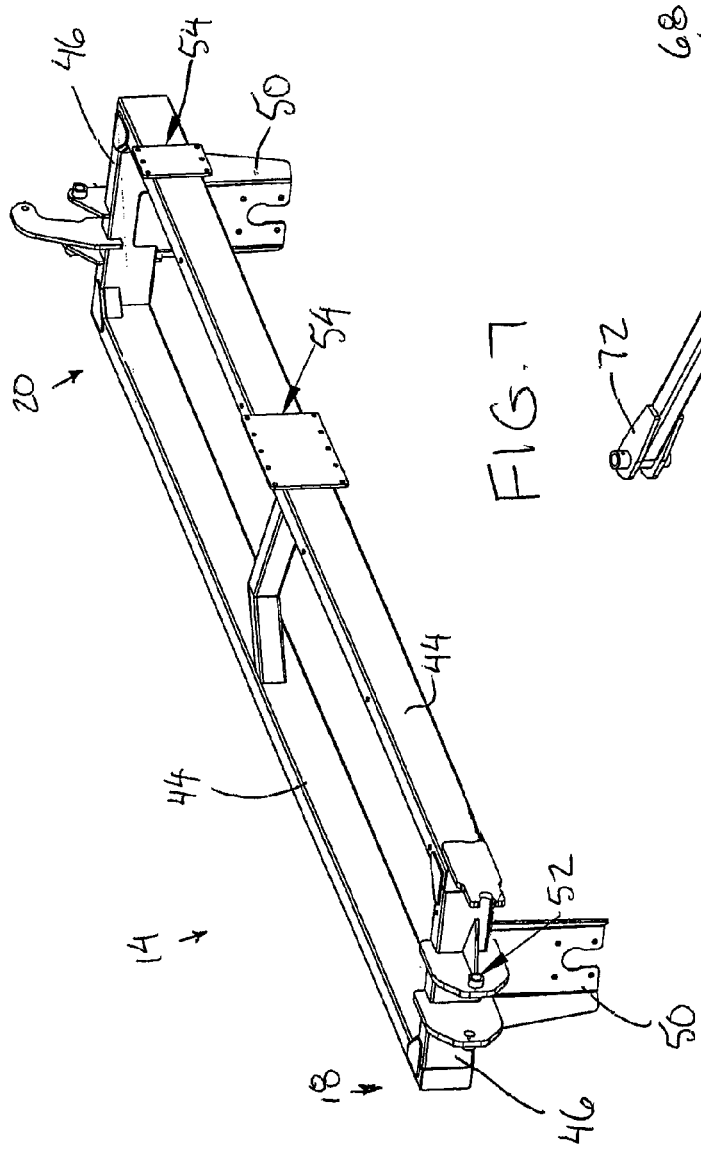
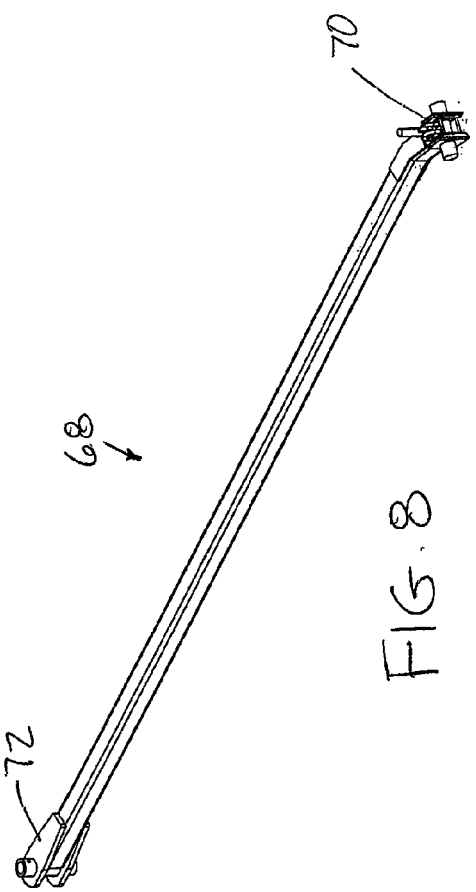

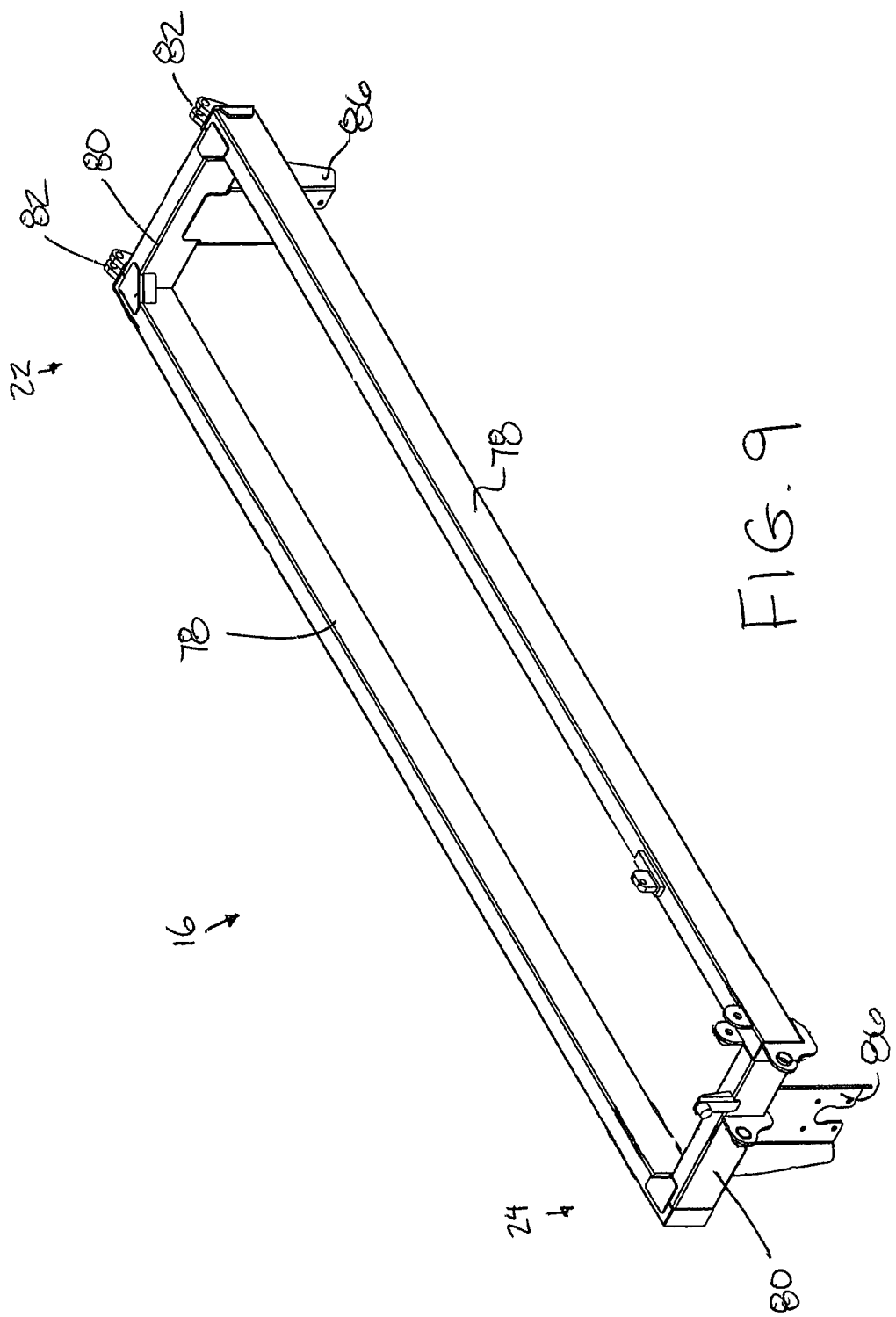

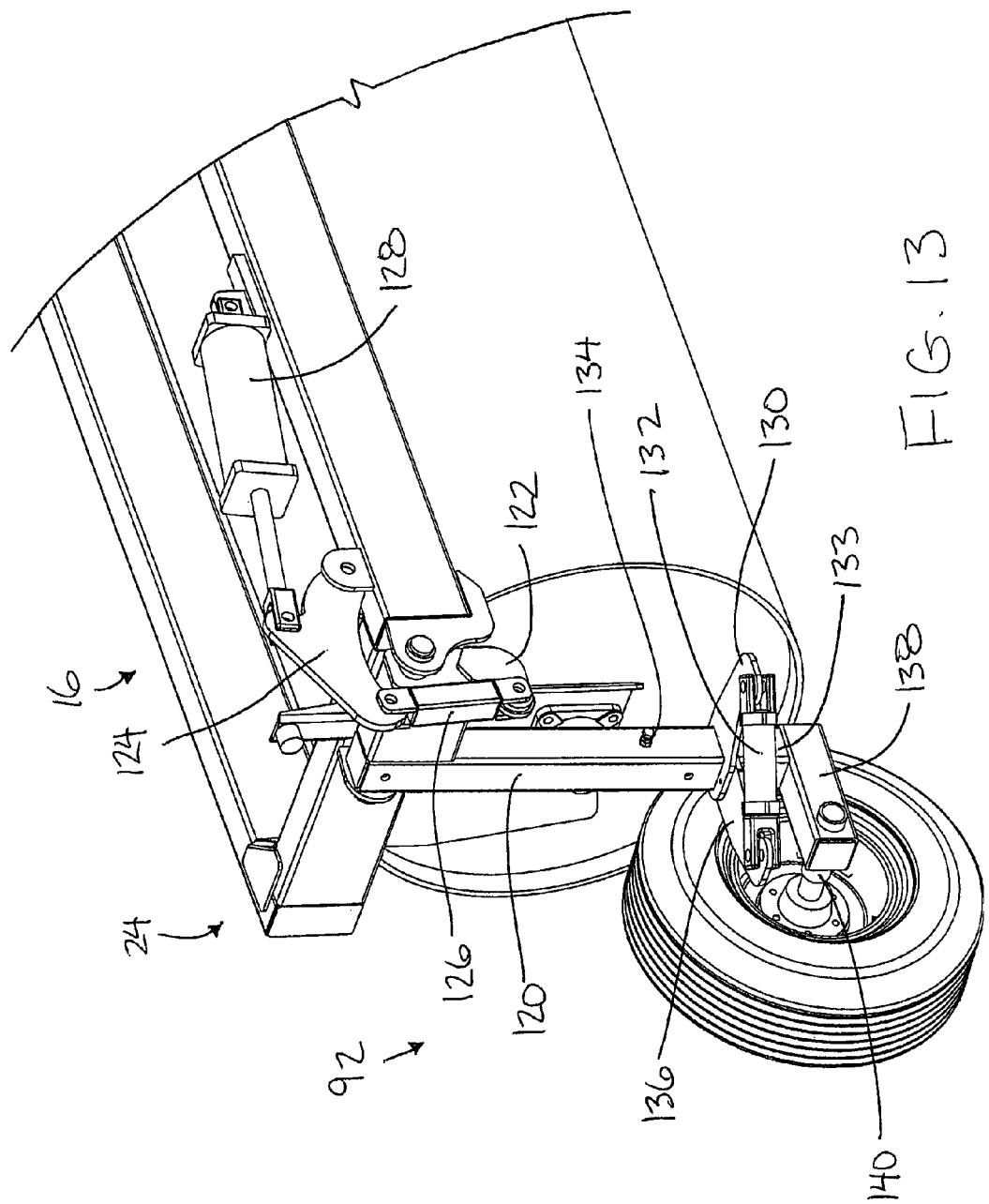

AGRICULTURAL LAND ROLLER IMPLEMENT

FIELD OF THE INVENTION

The present invention relates to an agricultural implement comprising a plurality of roller sections which are foldable relative to one another from a working position to a transport position, and more particularly the present invention relates to a land roller implement in which an outermost roller section can be separated to reduce a transport width of the implement.

BACKGROUND

Land roller implements are commonly used in agriculture for levelling land, pushing rocks down into the soil, breaking up soil mounds and clods, or packing seed for example. A typical land roller includes a plurality of frame sections, each supporting at least one roller thereon. The roller may be a steel drum, a series of packer wheels or any other rolling packing element. Due to the low draft resulting from the rolling movement of the rollers over the ground and the desirability to cover as much area as possible with each pass over an agricultural field with the implement, land roller implements are known to comprise wings comprised of two or more sections each. To ensure complete coverage however, accommodations must be made at the junction between each adjacent pair of sections.

United States Patent Application Publication No 2008/0314605 by Degelman et al discloses a land roller comprising a center roller section, two intermediate roller sections overlapping opposing ends of the center roller section in a trailing relationship, and two outer roller sections which overlap the outer ends of the intermediate roller sections in a trailing relationship. When folding the intermediate and outer roller sections rearward for transport, the trailing relationship between the intermediate and outer roller sections requires a center roller section to span a significant overall width in the transport position which may be problematic in some instances.

United States Patent Application Publication Nos. 2010/0307780 by Hulicsko and 2011/0265699 by McCrea et al each disclose land rollers having laterally opposed wings comprised of multiple roller sections, but the roller sections in this instance are mounted in series such that an additional packer wheel must be aligned with the gap between each adjacent pair of roller sections.

SUMMARY OF THE INVENTION

According to one aspect of the present invention there is provided a land roller implement arranged to be towed in a forward working direction by a towing vehicle for flattening and levelling land, the implement comprising:

a main frame section arranged for connection to the towing vehicle and supporting a main roller thereon;

a pair of intermediate frame sections, each spanning longitudinally between an inner end and an outer end and supporting a respective intermediate roller thereon;

the intermediate frame sections being pivotally coupled at the inner ends at laterally opposing sides of the main frame section for movement between a working position and a transport position;

in the working position the intermediate frame sections spanning outwardly in opposing lateral directions towards the outer ends such that the intermediate rollers are in a trailing relationship with the main roller on the main frame section for rolling movement across the ground in the forward working direction and such that the intermediate frame sections are pivotal relative to the main frame section about respective floating axes oriented in the forward working direction; and in the transport position the intermediate frame sections extending rearwardly from the inner ends coupled to the main frame section towards the outer ends in the transport position;

a pair of outer frame sections, each spanning longitudinally between an inner end and an outer end and supporting a respective outer roller thereon;

the outer frame sections being pivotally coupled at the inner ends on respective ones of the intermediate frame sections so as to be movable with the intermediate frame sections between the working position and the storage position;

in the working position the outer frame sections spanning outwardly in respective ones of the opposing lateral directions towards the outer ends such that the outer rollers are in a leading relationship with the intermediate rollers on the intermediate frame sections for rolling movement across the ground in the forward working direction; and in the transport position the outer frame sections extending rearwardly from the inner ends coupled to the intermediate frame sections towards the outer ends;

the intermediate frame sections each comprising a main portion spanning longitudinally between the inner and outer ends of the intermediate frame section upon which the intermediate roller is supported and an outer brace portion extending forwardly of the main portion to pivotally couple the respective outer frame section thereon about a floating axis oriented in the forward working direction in the working position; and a pair of inner brace members, each coupled to a respective one of the intermediate frame sections at an outer end of the inner brace member to extend forwardly therefrom to an inner end of the inner brace member pivotally coupled to the main frame section in the working position.

By providing outer frame sections which are forward of the intermediate frame sections, the intermediate frame sections can be folded directly adjacent one another behind a narrower width center frame section, similarly to a smaller land roller having only a single roller on each wing. Furthermore, bracing for both the intermediate and outer frame sections can be commonly anchored to the center frame section. By arranging the outer frame sections and bracing for the outer frame sections to be readily separable from the intermediate frame sections, the overall width for transport can be even further reduced.

The outer brace portion of each intermediate frame section is preferably fixed relative to the respective main portion such that the inner brace member of each intermediate frame section may be pivotally coupled to the outer brace portion of the respective intermediate frame section.

Preferably the outer brace portion of each intermediate frame section is readily separable from the main portion of the respective intermediate frame section by connection the outer brace portion to the main portion only using threaded fasteners.

When the outer brace portion of each intermediate frame section defines a pair of pivot mounts thereon upon which the respective outer frame section is pivotally mounted at spaced apart positions along the respective floating axis each outer frame section can be only connected to the respective intermediate frame section through pivotal connection to the respective outer brace portion. In this manner, when the outer brace portion of each intermediate frame section is readily separable from the main portion of the respective intermediate frame section, the outer frame section is readily separable from the main portion of the respective intermediate frame section together with the outer brace portion.

The outer brace portion of each intermediate frame section may comprise an inner frame member and an outer frame member joined at respective rear ends at laterally spaced apart positions on the main portion of the intermediate frame section to extend forwardly to be joined to one another at a forward end. The respective outer frame section is preferably pivotally coupled wholly on the outer frame member.

When there is provided a pair of first transport wheels arranged to support the inner ends of the outer frame sections respectively for rolling movement along the ground in the transport position, the first transport wheels are preferably supported wholly on the outer frame member of the outer brace portion of the respective intermediate frame section.

Preferably the inner end of each inner brace member is pivotally coupled to the main frame section about a respective floating axis which is coaxial with the floating axis of the respective intermediate frame section pivotally coupled to the main frame section. Each inner brace member is also preferably pivotally coupled at the outer end thereof to the inner frame member of the outer brace portion of the respective intermediate frame section.

When a pair of first transport wheels are arranged to support the inner ends of the outer frame sections respectively for rolling movement along the ground in the transport position, preferably the first transport wheels are supported forwardly of the respective intermediate rollers in the working position of the frame sections.

When a pair of second transport wheels are arranged to support the outer ends of the intermediate frame sections respectively for rolling movement along the ground in the transport position, preferably the second transport wheels are supported rearwardly of the respective outer rollers in the working position of the frame sections.

Preferably there is also provided a pair of third transport wheels arranged to support the outer ends of the outer frame sections respectively for rolling movement along the ground in the transport position.

Preferably at least one of the pairs of wheels comprises a pair of caster wheels supported on a freely rotatable post in which the rotatable post is coupled to the respective frame section by a pair of parallel links for movement between a lowered position for supporting the frame section in the transport position and a raised position so as not to interfere with rolling movement of the rollers along the ground in the working position. The parallel links are preferably spaced above respective wheels on the rotatable posts so as not to interfere with full rotation of the wheels about an upright castoring axis of the respective rotatable post. Each caster wheel may be supported on the respective rotatable post by a support arm extending radially outwardly from the bottom end of the post. When each rotatable post is rotatably received within a respective vertical tube, the respective pair of links are preferably pivotally coupled to the vertical tube at vertically spaced positions thereon spaced above the support arm. A bottom end of each vertical tube is preferably spaced below the respective pivot links and is substantially in abutment with the respective support arm. The caster wheel assembly may further include a lock pin supported on each support arm for sliding movement in a radial direction relative to the vertical tube for movement between a locked position engaged within a locking aperture in the vertical tube to resist relative rotation therebetween and a released position in which the caster wheels are freely rotatable about the respective upright castoring axis.

Preferably at least one other ones of the pairs of wheels comprises a pair of steerable wheel assemblies. Each steerable wheel assembly preferably includes:

i) an upright tube which is pivotally coupled at an upper end of the respective frame section for pivotal movement between a lowered position for supporting the frame section in the transport position and a raised position so as not to interfere with rolling movement of the rollers along the ground in the working position;

ii) a linkage coupled between the upright tube and the frame section for controlling movement of the upright tube between the lowered and raised positions;

iii) a rotatable post rotatable received within the upright tube and which is oriented to be rotatable about an upright steering axis in the lowered position of the steerable wheel;

iv) a support arm extending radially outward from a bottom end of the rotatable post so as to support a dual wheel assembly thereon;

v) a steering arm extending radially outward from the rotatable post at a location spaced above the support arm such that a bottom end of the upright tube is substantially abutted with the steering arm; and vi) a steering actuator coupled between a mounting portion of the upright tube and the steering arm so as to control rotation of the support arm and steering arm on the rotatable post about the upright steering axis relative to the upright tube.

Some embodiments of the invention will now be described in conjunction with the accompanying drawings in which:

BRIEF DESCRIPTION OF THE DRAWINGS

FIG. 3 is a perspective view of the main frame section;

FIG. 4 is a top plan view of the main frame section;

FIG. 5 is a perspective view of an outer end of the main portion of one intermediate frame section;

FIG. 6 is a perspective view of the outer brace portion of one intermediate frame section;

FIG. 7 is a perspective view of an inner end of the main portion of one intermediate frame section;

FIG. 8 is a perspective view of the inner brace member;

FIG. 9 is a perspective view of the outer end of one outer frame section;

FIG. 13 is a perspective view of the steerable wheel assembly at the outer end of the outer frame section;

In the drawings like characters of reference indicate corresponding parts in the different figures.

DETAILED DESCRIPTION

Figure 1:
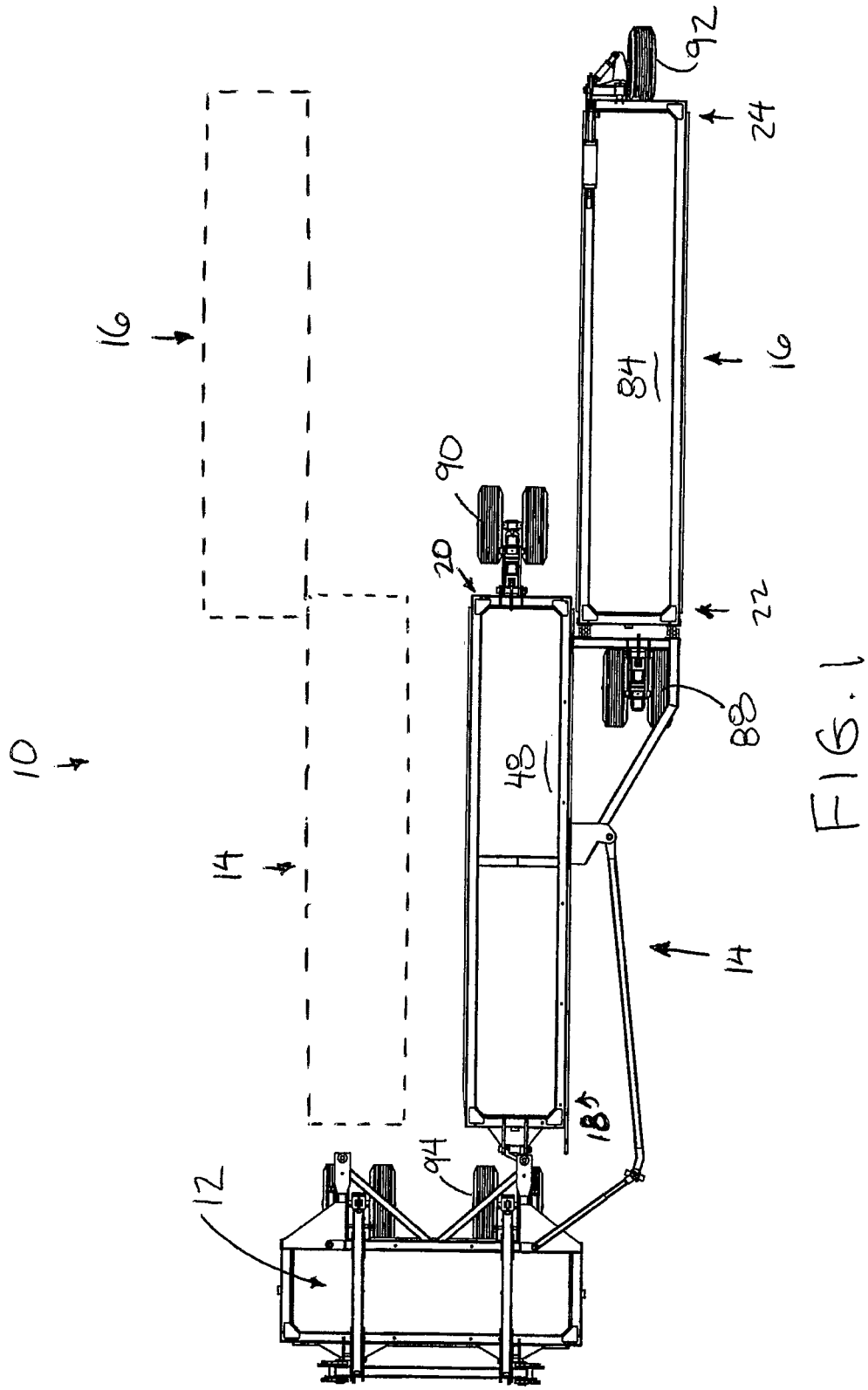
FIG. 1 is a top plan view of the land roller implement showing one of the wings in the transport position in which the other wing is symmetrical to the wing which is shown.

Referring to the accompanying drawings, there is illustrated a land roller implement generally indicated by reference numeral 10. The implement 10 is suited for connection to a towing vehicle for rolling movement across the ground to flatten and level agricultural land for example. The implement is moveable between a working position and a transport position. In the working position, the implement primarily spans generally laterally so as to be perpendicular to a forward working direction of a towing vehicle which tows the implement across a field. In the transport position the implement primarily extends generally rearwardly in a trailing relationship from the towing vehicle to reduce the overall width in the lateral direction for transport on roads for example.

The implement generally includes a main frame section 12 centrally located between a pair of wings in which wing includes one intermediate frame section 14 and one outer frame section 16. Each intermediate frame section 14 is elongate between an inner end 18 and an outer end 20. Similarly each outer frame section is elongate between an inner end 22 and an outer end 24.

The intermediate frame sections are coupled to the main frame section at laterally opposing ends thereof such that each inner end of the intermediate frame sections overlaps in the longitudinal direction the corresponding end of the main frame section in the longitudinal direction of the frame sections in the working position. The intermediate frame sections however are positioned in a trailing relationship with the main frame section.

The outer frame sections are coupled to the intermediate frame sections such that each outer frame section is coupled at an inner end adjacent to the outer end of a respective intermediate frame section to overlap one another in the longitudinal direction of the frame sections. The outer sections lead the intermediate sections at a position forwardly thereof in the working position such that each intermediate frame section trails both the main frame section and the corresponding outer frame section in the working position. Furthermore, each outer frame section is coupled to the respective intermediate frame section such that the outer and intermediate frame sections are movable together about a vertical folding axis relative to the main frame section between the working and transport positions.

In the working position, the frame sections are supported such that rollers on the frame sections are in rolling engagement with the ground in the forward working direction as described in further detail below.

In the transport position, the frame sections are supported such that the rollers are spaced above the ground for transport on transport wheels as described in further detail below.

The main frame section 12 comprises two longitudinal frame members 26 spanning in the longitudinal direction along front and rear sides of the frame section between two end cross bars 28 joined between the longitudinal frame members 26 at the opposing ends. Two forward frame members 30 span across the longitudinal frame members in the forward working direction to be connected by a forward cross bar 32 at a forward end spaced forwardly of the longitudinal frame members.

Opposing ends of the forward cross bar 32 define a pair of latches 34 arranged to receive bracing components for the wing frame sections in the working position. Each latch defines a socket receiving a corresponding latching component therein such that the latching component is pivotal relative to the main frame section about a first floating axis which is horizontal and oriented in the forward working direction. A latching actuator 36 is coupled to each latch for opening and closing the latch to selectively retain latching components therein.

The rear ends of the two forward frame members 30 project rearwardly beyond the longitudinal frame members for supporting a pair or knuckle mounts 38 respectively thereon. Each knuckle mount includes a vertical pivot shaft 40 defining the vertical folding axis about which the intermediate and outer frame sections are pivotal between the working and transport positions.

The two end cross bars 28 each locate a roller mount 42 thereon to support a main roller on the main frame section. The roller mounts 42 extend below the longitudinal frame members and define the roller axis of the main rollers spanning therebetween horizontally and perpendicular to the forward working direction so that the main roller is arranged for rolling movement in the forward working direction when engaged with the ground. The main roller spans the full length of the main frame section between the opposing end cross bars 28 as well as spanning the full width in the forward working direction such that the diameter of the main roller is approximately equal to the width between the two longitudinal frame members 26 supported thereabove.

The two intermediate frame sections similarly each comprise two longitudinal frame members 44 extending in the longitudinal direction at respective front and rear sides of the intermediate frame section in the working position. The two longitudinal frame members span the full length of the frame section between two end cross bars 46 at opposing ends of the frame which are connected between the longitudinal frame members. An additional intermediate cross bar may span between the longitudinal frame members at an intermediate location between the opposing ends for additional structural support. The longitudinal frame members and the cross bars collectively define a main portion of the intermediate frame section which supports an intermediate roller 48 thereon. The intermediate roller is supported by roller mounts 50 extending below each of the two end cross bars 46 respectively to define the roller axis of the intermediate roller 48 spanning in the longitudinal direction of the frame section. The intermediate roller spans the full length of the respective frame section between the end cross bars 46 as well as spanning the full width between the longitudinal frame members which are located thereabove similarly to the main frame section.

A knuckle mount 52 is mounted on the end cross bar 46 at the inner end of each intermediate frame section to define a horizontal floating axis of the intermediate frame section relative to the main frame section. The floating axis is oriented in the forward working direction in the working position so as to be coaxial with the floating axis of the latching components defined by the respective latches 34 on the main frame section. The floating axes are horizontal and perpendicular to the forward working direction in the transport position. A suitable knuckle component is coupled between the vertical pivot shaft of the knuckle mounts 38 on the main frame section and a horizontal pivot shaft of the knuckle mounts 52 on the intermediate frame sections such that each intermediate frame section is pivotal about both the vertical folding axis and the horizontal floating axis relative to the main frame section.

The main portion of the intermediate frame section also includes two bracket mounts 54 mounted thereon at spaced positions in the longitudinal direction along the forward one of the two longitudinal frame members 44. One of the bracket mounts 54 is mounted centrally in the longitudinal direction adjacent the intermediate cross bar, while the other bracket mount 54 is located adjacent the outer end of the frame section. The bracket mounts serve to mount an outer brace portion 56 of each intermediate frame section using threaded fasteners such that the outer brace portion is selectively separable from the main portion of the intermediate frame section simply by removing the threaded fasteners which form the only connection between the outer brace portion and the main portion of each intermediate frame section.

Each outer brace portion 56 includes an inner frame member 58 having a vertical plate bracket mount at the rear end thereof for direct mounting to the corresponding vertical plate bracket mount located at the intermediate location on the front of the intermediate frame section. Corresponding apertures between the vertical plates permit connection using the threaded fasteners. The outer brace portion 56 also includes an outer frame member 60 which locates a vertical plate bracket mount at the rear end thereof for connection to the other bracket mount 54 adjacent the outer end of the intermediate frame section. Similar apertures permit connection with the threaded fasteners.

The outer frame member 60 is oriented perpendicularly to the longitudinal direction of the frame section to extend in the forward working direction in the working position of the frame sections. The inner frame member 58 extends forwardly at an outward incline in the working position such that the inner and outer frame members of the outer brace portion are joined together at the forward end at a location spaced forwardly of the outer end of the intermediate frame section in the working position.

The outer frame member 60 defines a pair of pivot mounts 62 at spaced positions thereon which are arranged to be coupled to the inner end of a respective outer frame section to define an outer floating axis of the outer frame section relative to the intermediate frame section in which the outer floating axis is oriented in the forward working direction in the working position of the frame section.

The rear end of the inner frame member 58 is connected to the respective bracket mount with additional gusset plates 54 which define a vertical pivot mount 66 on the inner frame member for connection to an inner brace member 68.

Figure 2:
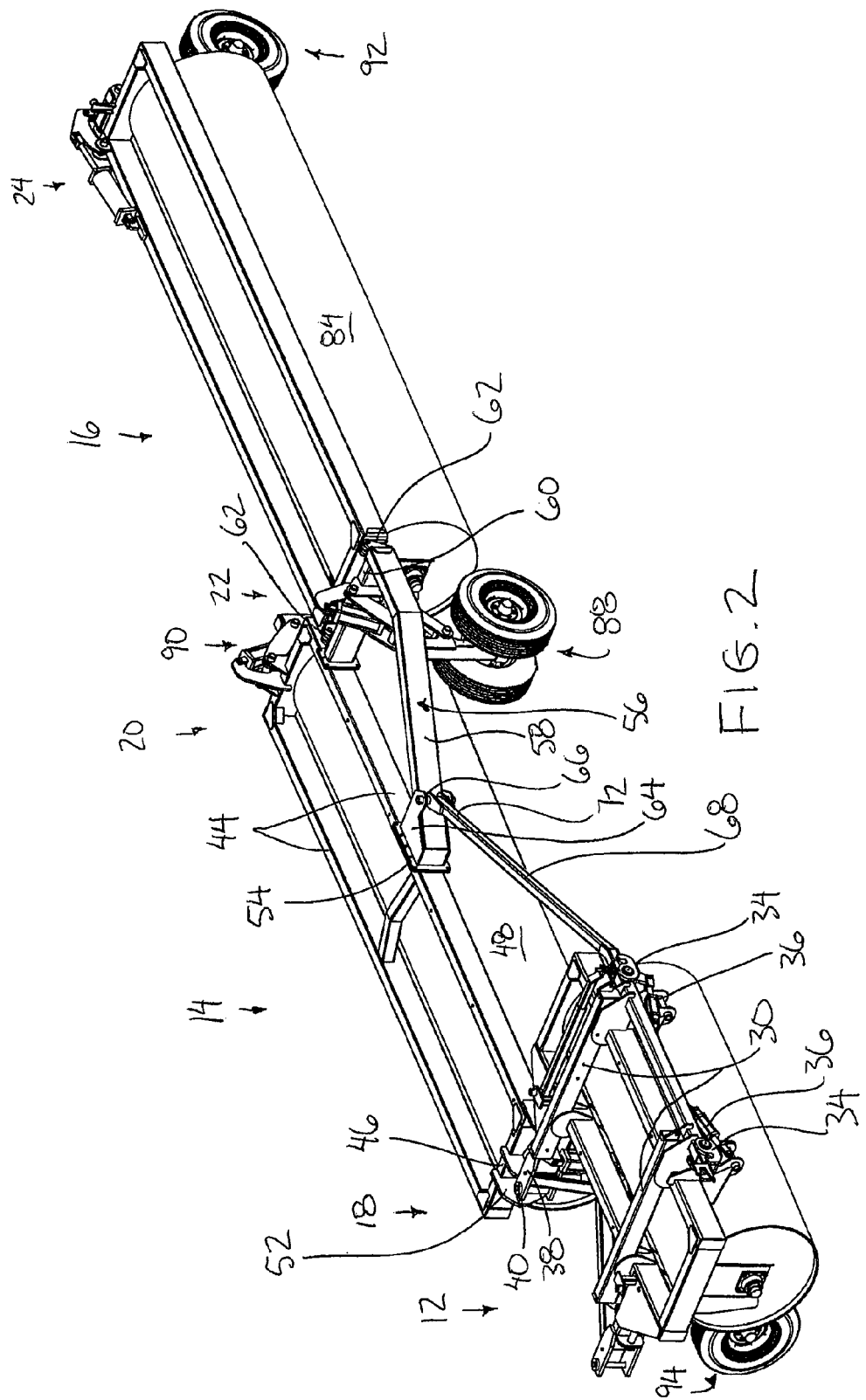
FIG. 2 is a perspective view of one of the wings in the working position relative to the main frame section.

The inner brace member 68 is an elongate frame member extending between an inner end 70 arranged to be coupled within a respective latch 34 in the working position and an outer end 72 which is pivotally coupled to the vertical pivot mount 66 on the respective outer brace portion of the respective intermediate frame section. The outer end of each inner brace member locates a vertical pivot shaft thereon for coupling to the inner frame member of the outer brace portion at a location spaced forwardly of the intermediate roller as best shown in FIGS. 1 and 2. The opposing inner end 70 includes a horizontal pivot shaft 74 which is received within the respective latch 34 on the main frame section in the working position such that the pivot shaft 74 is aligned with the floating axis defined by the latch 34 which is coaxial with the second floating axis defined by the knuckle mounts 52 coupling the intermediate frame section to the main frame section.

A guide arm 76 is coupled to the inner end of the inner brace member for relative pivotal movement about a vertical pivot axis therebetween. In the working position, the guide arm 76 extends rearwardly to the second end coupled onto the main frame section for relative pivoting about a vertical axis therebetween. In the working position, the guide arm extends forwardly in the working direction from the second end to the first end while the inner brace member extends inwardly at a forward inclination from the pivotal connection to the outer brace portion of the intermediate frame section to the corresponding latch 34. When the latch is released, the intermediate frame section is permitted to fold rearwardly into the transport position such that the longitudinal direction is aligned with the forward working direction. In this manner, the guide arm extends rearwardly at an outward inclination from the second end to the first end while the inner brace member extends generally rearwardly from the inner end coupled to the guide arm 76 to the outer end connected to the outer brace portion.

Each outer frame section also includes two longitudinal frame members 78 extending in the longitudinal direction of the respective frame section at forward and rearward ends of the frame in the working position. Two end cross bars 80 are coupled between the longitudinal frame members at the opposing ends thereof. Two pivots 82 are spaced apart along the cross bar 80 at the inner end of the outer frame section or pivotal connection to the respective pivot mounts spaced apart on the outer frame member of the outer brace portion of the intermediate frame section which serve as the only connection between the outer frame section and the intermediate frame section. An outer roller 84 is supported on respective roller mounts 86 depending from the two end cross bars 80 respectively to define a roller axis extending in the longitudinal direction of the outer frame sections similarly to the other frame sections. Also similarly to the other frame sections, the outer roller 84 spans the full length of the frame section between the two end cross bars as well as having a diameter which spans the full width between the two longitudinal frame members 78 supported above the roller.

In this arrangement, the outer frame sections and the inner brace members are only connected to the respective intermediate frame sections through the outer brace portion 56 which is the only supportive connection between the outer frame section and the intermediate frame section and which is readily separable from the remaining main portion of the intermediate frame section. As shown in the accompanying figures, this results in a configuration in which: I) each inner brace member is pivotally coupled to the respective intermediate frame section at a location which is spaced forwardly of a leading side of the intermediate roller; ii) each inner brace member is pivotally coupled to the respective intermediate frame section at a location which is spaced forwardly of said at least one longitudinal frame member of the main portion of the intermediate frame section; and iii) each inner brace member is commonly supported together with the respective outer frame section on the outer brace portion of the intermediate frame section that protrudes forwardly from said at least one longitudinal frame member of the main portion of the intermediate frame section. By detaching the outer brace portion from the main portion of each intermediate frame section, the overall width in the transport position can be greatly reduced. Due to the outer frame sections being positioned forwardly of the intermediate frame sections in the working position, the main roller only has a sufficient width to span the combined width of the two intermediate frame sections positioned directly adjacent one another trailing the main roller in the transport position. The overall width of the main roller section and the intermediate frame sections trailing behind the main frame section in the transport position can be reduced to 8 feet or less for example to permit regular transport on conventional roadways. The bracing components and the outer frame sections can then be arranged for separate towing in a trailing relationship with the intermediate frame sections or can be transported by towing with a separate towing vehicle when transporting over long distances over conventional roadways for example. The outer frame sections are intended to remain connected to the intermediate frame sections for transport over short distances or across fields and the like for example. As further shown in the accompanying figures, in the transport position an overall lateral width of the implement perpendicular to the forward direction is defined by the outer frame sections supported on the outer brace portions of the intermediate frame sections. Because the outer brace portion of each intermediate frame section is readily separable from the main portion of the respective intermediate frame section: i) the respective outer frame section is readily separable from the main portion of the respective intermediate frame section by separation of the outer brace portion that is the sole connection of the outer frame section to the intermediate frame section; and ii) the overall lateral width of the implement is reduced when the outer brace portions are separated from the intermediate frame sections respectively.

A first pair of pivotal transport wheels 88 are connected to the outer frame member of the outer brace portion of the intermediate frame section to support the inner end of the respective outer frame section spaced above the ground for transport. The connection to the outer frame member is the sole connection between the first transport wheels and the frame sections such that the first pair of pivotal transport wheels are separable with the outer frame sections from the intermediate frame sections.

Similarly, the cross bar 46 at the outer end of each intermediate frame section supports a respective second pivotal transport wheel 90 for supporting the outer end of the intermediate section spaced above the ground in the transport position. The connection to the end cross bar 46 is the sole connection between the second transport wheels and the frame sections.

The end cross bar 80 at the outer end of each outer frame section provides the sole connection to respective third pivotal transport wheels 92 which support the outer ends of the outer frame sections in the transport position. Each outer roller is thus shown in the figures to be supported on the respective outer frame section between the respective first pivotal transport wheel 88 at the inner end and the respective third pivotal transport wheel 92 at the outer end such that the first and third pivotal transport wheels are longitudinally opposed from one another on the outer frame section and the outer frame section is arranged to be supported by the first and third pivotal transport wheels for towing separately from the intermediate frame sections when the outer brace portion is separated from the respective main portion of each intermediate frame section.

Additional transport wheels 94 are provided at two spaced apart locations across the rear end of the main frame section for movement between raised and lowered positions relative to the main frame section for supporting the main frame section in the transport position. More particularly, when the main transport wheels are lowered, the main roller is supported spaced above the ground such that the main transport wheels are in rolling engagement with the ground. The main frame section is supported in the transport position by the auxiliary transport wheels 94 at the rear end and the hitching connection to the towing vehicle connected through the main frame section at the forward end thereof.

The first and second pivotable transport wheels 88 and 90 each comprise a castor wheel assembly as described in further detail below. The third pivotable transport wheels 92 each comprise a steerable wheel assembly also as described in further detail below.

Figure 10:
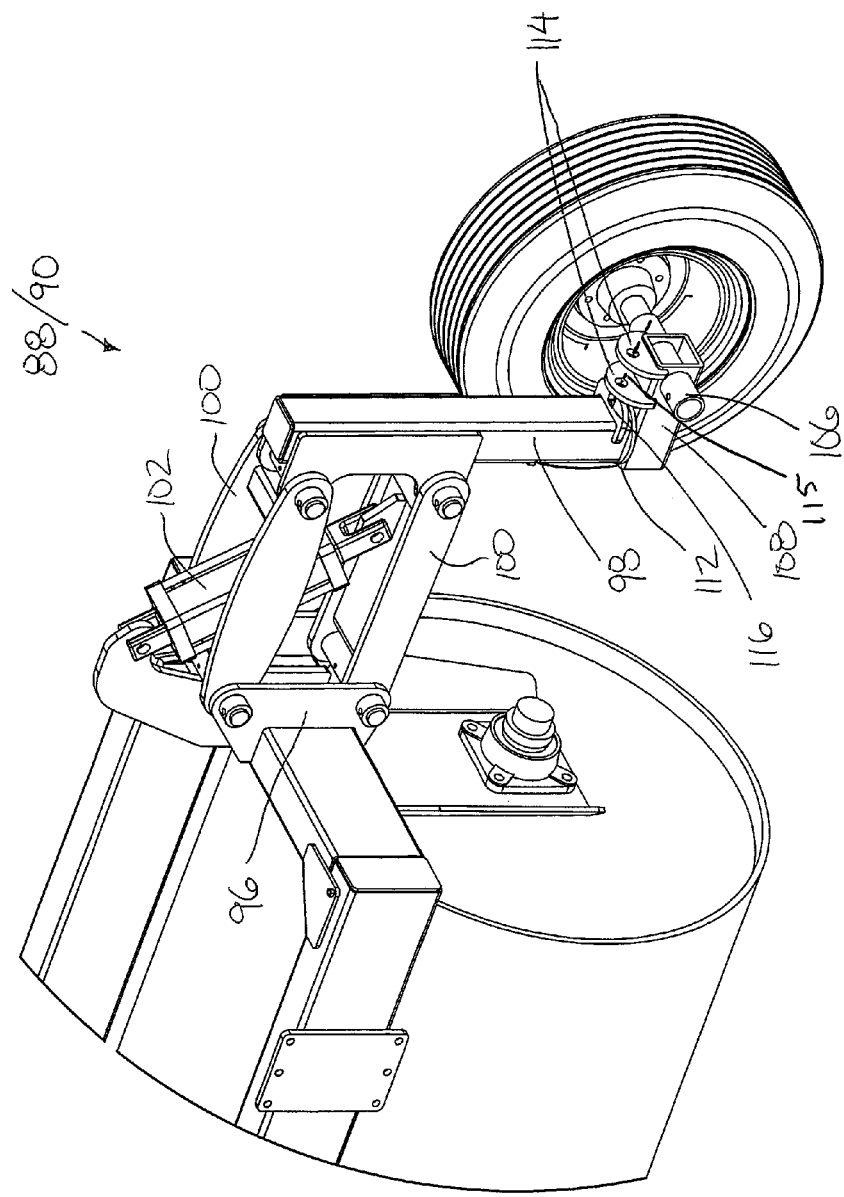
FIG. 10 is a perspective view of one of the caster wheel assemblies.
Figure 12:
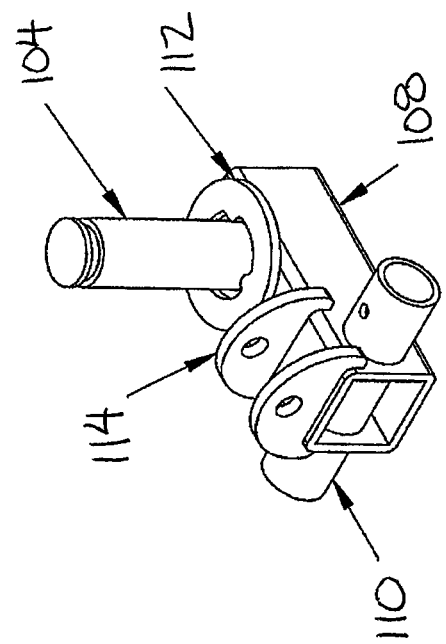
FIG. 12 is a perspective view of the rotatable post portion of the caster wheel assembly of FIG. 10.
Figure 11:
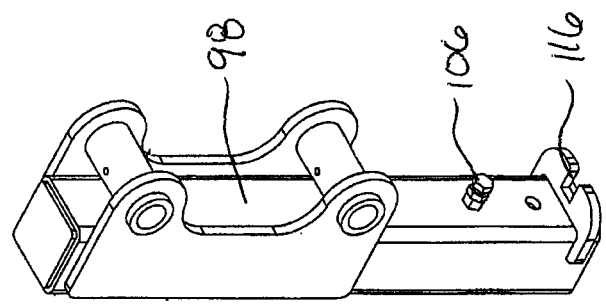
FIG. 11 is a perspective view of the upright tube portion of the caster wheel assembly of FIG. 10.

Turning now to FIGS. 10 through 12, each castor wheel assembly includes a frame mount 96 which defines a pair of vertically spaced apart horizontal pivot mounts having pivot axes which are parallel to one another and perpendicular to the longitudinal direction of the respective frame section. The castor assembly also includes a vertical tube 98 locating an additional pair of vertically spaced apart horizontal pivots thereon at a similar vertical spacing therebetween. To parallel pivot links 100 are coupled between the pivot mounts on the frame mount and vertical to respectively define a parallel linkage which maintains the vertical tube 98 in a vertical orientation as it is pivoted between raised and lowered positions relative to the frame section.

An actuator 102 is provided in the form of a linear hydraulic actuator which can be extended and retracted under hydraulic control. The actuator is mounted at one end on the frame section above the frame mount 96 and is mounted at the opposing end on the vertical tube spaced below the connection to the frame section. In the raised position, the links extend from the frame section to the vertical tube generally horizontally or at an upward inclination so that wheels at the bottom end of the vertical tube do not engage the ground and provide no interference with rolling movement of the corresponding roller across the ground. In the lowered position, the pivot links at the outer ends connected to the vertical tube are lower than the raised position so as to extend at a downward inclination to engage the wheels with the ground such that the roller is positioned spaced above the ground.

Each castor wheel assembly further includes a rotatable post 104 received rotatably within the vertical tube 98 to define a vertical castoring axis. An annular groove is received about the rotatable post in alignment with a set screw 106 threaded into the vertical tube so that the screw retains the post within the tube without restricting relative pivotal movement therebetween.

The bottom end of the rotatable post includes a support arm 108 which extends radially outward from the bottom end of the post and supports a wheel axle 110 thereon radially spaced from the post. The wheel axle is generally horizontal for supporting a pair of wheels at opposing ends thereof corresponding to opposing sides of the support arm.

An annular flange 112 is formed about the post directly above the support arm to define an annular surface perpendicular to the vertical castoring axis which is arranged to abut the bottom end of the tube to transfer a vertical load therethrough without limiting the rotation of the support arm and wheels thereon about the vertical castoring axis. The vertical tube has sufficient length between the connection to the parallel links and the support arm therebelow so that the parallel links do not interfere with 360 degree rotation of the castoring wheels relative to the vertical tube.

A pair of mounting plates 114 are mounted on the support arm to support a locking pin 115 slidable through corresponding apertures in the plates such that the pin is slidable radially in the direction of the support arm relative to the rotatable post and tube within which it is received. A locking plate mounted on the bottom end of the vertical tube 98 locates a slot 116 therein to receive the inner end of the locking pin 115 therein in a locked position. In the locked position, the locking pin restricts relative rotation between the support arm carrying the castor wheels and the vertical tube to selectively fix the orientation of the castor wheels relative to the frame section. The locked orientation corresponds to the castor wheel axis being perpendicular to the roller axis such that the castor wheels are arranged for rolling movement on the ground in the longitudinal direction of the respective frame section.

Figure 15:
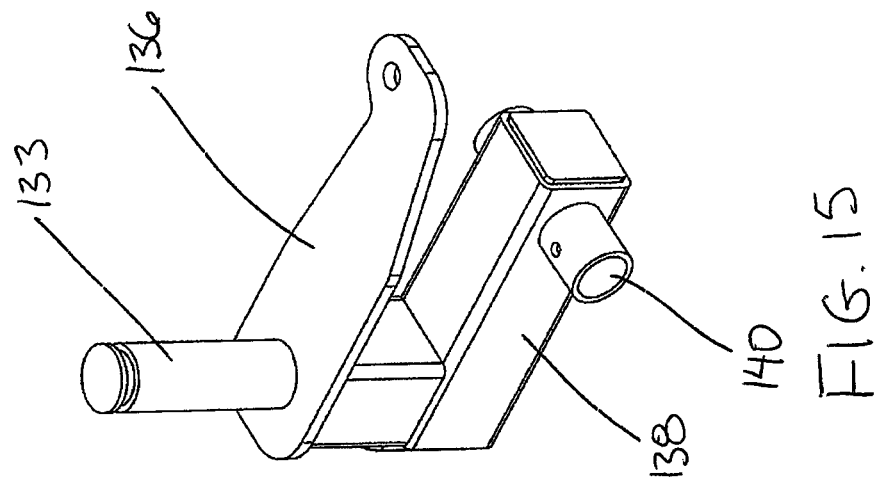
FIG. 15 is a perspective view of the rotatable post portion of the steerable wheel assembly of FIG. 13.
Figure 14:
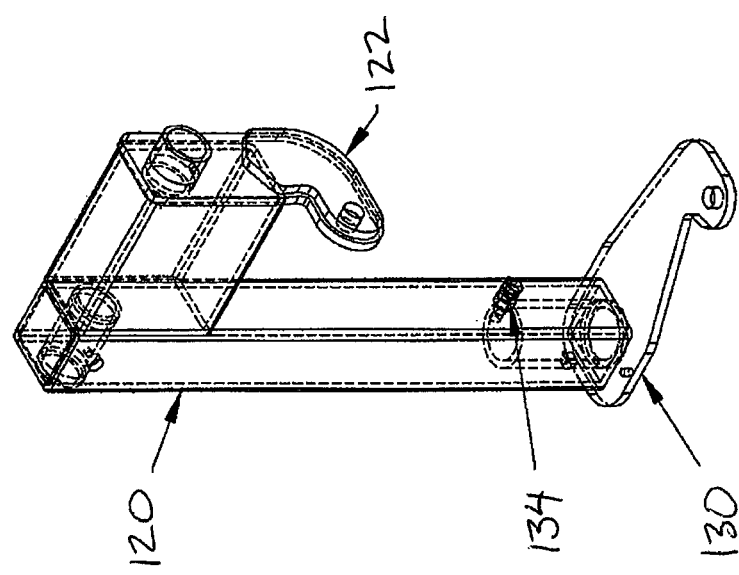
FIG. 14 is a perspective view of the upright tube portion of the steerable wheel assembly of FIG. 13.

Turning now to FIGS. 13 through 15, each steerable wheel assembly includes an upright tube 120 which is pivotally connected at the upper end on the corresponding cross bar at the end of the frame section. The tube extends generally downwardly towards a bottom end supporting the steerable wheel thereon such that the wheel can be raised and lowered relative to the frame section by pivoting of the upright tube relative to the frame section. In the lowered position of the steerable wheel, the upright tube is in a vertical orientation such that wheels at the bottom end of the upright tube engage the ground and support the roller spaced upwardly from the ground. In the raised position of the steerable wheel, the upright tube extends downwardly at an inclination such that the wheels at the bottom end of the upright tube are sufficiently raised to be spaced above the ground and not interfere with forward rolling movement of the roller.

Pivoting of the wheel between raised and lowered positions is accomplished by a linkage coupled between a lug 122 fixed adjacent the upper end of the upright tube and the frame section. The linkage includes a rotator link 124 pivotally coupled to the frame section for connection to the lug 122 by a connector link 126 pivotally coupled at opposing ends on the rotator link and lug respectively. An actuator 128 comprising a linear hydraulic actuator is then pivotally coupled at opposing ends on the frame section and the rotator link respectively. In this manner, extending and retracting the actuator pivots the rotator link in a manner which draws the connector link and lug 22 connected thereto upwardly for pivoting the upright tube upwardly into the raised position.

The bottom end of the upright tube includes a steering anchor plate 130 which is perpendicular to the longitudinal direction of the upright tube and extends radially outward therefrom for anchoring one end of a steering actuator 132 thereon.

A rotatable post 134 is rotatably received within the upright tube 120 such that the tube defines an upright steering axis of the post relative to the tube and frame section. Similar to the castor wheel an annular groove is provided in the top end of the post for mating alignment with a set screw 134 threaded through the wall of the upright tube to retain a post longitudinally within the tube without restricting relative rotation therebetween.

A steering arm 136 is coupled to the rotatable post at a location spaced upwardly from the bottom end thereof to extend radially outwardly. Similarly to the steering anchor plate, the steering arm 136 comprises a plate oriented perpendicularly to the upright steering axis. In the retained position of the post within the tube, the steering anchor plate 30 at the bottom end of the upright tube is abutted onto the steering arm so as to allow relative rotation therebetween while permitting the load to be transferred along the axis therethrough by the abutment.

The rotatable post also includes a support arm 138 extending radially outward from the bottom end of the post in the same radial direction as the steering arm. The support arm supports a wheel axle 140 thereon at a position spaced radially outward from the upright steering axis for mounting a dual set of wheels in opposing ends of the axle at opposing sides of the support arm respectively. The support arm is spaced vertically below the steering actuator sufficiently that the steering arm is above the height of the wheels to permit connection of the other end of the steering actuator 132 thereon. In this manner, extending and retracting the steering actuator 132 acts to change the angular position of the steering arm relative to the steering anchor plate which in turn controls the steering movement of the dual wheel assembly on the support arm about the upright steering axis.

Typically, in the transport position shown in FIG. 1, the steerable wheels are oriented such that their axis of rotation is perpendicular to the longitudinal direction of the outer frame section so that the wheels are supported for rolling in the forward working direction together with the castor wheel assemblies. When it is desired to displace the frame sections into the working position, the orientation of the steerable wheels at the outer ends of the outer sections can be rotated through 90 degrees to be oriented in the same rolling direction as the outer rollers. By reversing the implement, the wings will unfold from the transport position to the working position where the inner brace members can be connected to the respective latches to retain the frame sections in the working position. All of the transport wheels are then raised relative to the frame sections such that only the rollers are engaged with the ground for rolling movement in the forward working direction.

For return to the transport position, the latches are opened and the wheels are lowered into their lowered position so that the rollers are no longer engaged with the ground. The steerable wheel assemblies are also steered such that their axis of rotation is perpendicular to the longitudinal direction of the frame sections. Advancing the implement into the forward working direction thus causes the outer frame sections to be pivoted together with the respective intermediate frame sections about the respective vertical folding axes until the intermediate and outer frame sections have their longitudinal directions oriented rearwardly from the center section. The castor wheels can be unlocked in a castoring position during movement from the working position to the transport position and from the transport position back to the working position. Once in the transport position, the castor wheels are typically locked to remain fixed for rolling movement in the forward working direction.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A land roller implement arranged to be towed in a forward working direction by a towing vehicle for flattening and levelling land, the implement comprising:

a main frame section arranged for connection to the towing vehicle and supporting a main roller thereon;

a pair of intermediate frame sections, each intermediate frame section spanning longitudinally between an inner end of the intermediate frame section and an outer end of the intermediate frame section and supporting a respective intermediate roller thereon;

the intermediate frame sections being pivotally coupled at the inner ends of the intermediate frame sections at laterally opposing sides of the main frame section for movement between a working position and a transport position;

in the working position the intermediate frame sections spanning outwardly in opposing lateral directions towards the outer ends of the intermediate frame sections such that the intermediate rollers are in a trailing relationship with the main roller on the main frame section for rolling movement across the ground in the forward working direction and such that the intermediate frame sections are pivotal relative to the main frame section about respective floating axes of the intermediate frame sections relative to the main section oriented in the forward working direction; and in the transport position the intermediate frame sections extending rearwardly from the inner ends of the intermediate frame sections coupled to the main frame section towards the outer ends of the intermediate frame sections;

a pair of outer frame sections, each outer frame section spanning longitudinally between an inner end of the outer frame section and an outer end of the outer frame section and supporting a respective outer roller thereon;

the inner ends of the outer frame sections being pivotally coupled on the outer ends of the intermediate frame sections respectively such that the outer frame sections are movable together with the intermediate frame sections between the working position and the transport position;

in the working position the outer frame sections spanning outwardly in respective ones of the opposing lateral directions towards the outer ends of the outer frame sections such that the outer rollers are in a leading relationship with the intermediate rollers on the intermediate frame sections for rolling movement across the ground in the forward working direction; and in the transport position the outer frame sections extending rearwardly from the inner ends of the outer frame sections towards the outer ends of the outer frame sections;

the intermediate frame sections each comprising a main portion including at least one longitudinal frame member that fully spans longitudinally between the inner and outer ends of the intermediate frame section and that supports the intermediate roller thereon and an outer brace portion extending forwardly from said at least one longitudinal frame member of the main portion;

the outer frame sections being pivotally coupled to the respective intermediate frame sections by connection to the outer brace portion at a location forwardly of said at least one longitudinal frame member of the main portion of the respective intermediate frame section such that each outer frame section is pivotal about a respective floating axis that is oriented in the forward working direction in the working position relative to the respective intermediate frame section; and a pair of inner brace members, each inner brace member being pivotally coupled to a respective one of the outer brace portions of the intermediate frame sections at an outer end of the inner brace member to extend forwardly therefrom to an inner end of the inner brace member pivotally coupled to the main frame section in the working position such that:

i) each inner brace member is pivotally coupled to the respective intermediate frame section at a location which is spaced forwardly of a leading side of the intermediate roller;

ii) each inner brace member is pivotally coupled to the respective intermediate frame section at a location which is spaced forwardly of said at least one longitudinal frame member of the main portion of the intermediate frame section; and iii) each inner brace member is commonly supported together with the respective outer frame section on the outer brace portion of the intermediate frame section that protrudes forwardly from said at least one longitudinal frame member of the main portion of the intermediate frame section.

2. The implement according to claim 1 wherein the outer brace portion of each intermediate frame section is fixed in orientation relative to the respective main portion.

3. The implement according to claim 1 wherein the outer brace portion of each intermediate frame section includes a pair of pivot mounts thereon upon which the respective outer frame section is pivotally mounted at spaced apart positions along the respective floating axis of the respective outer frame section relative to the respective intermediate frame section.

4. The implement according to claim 1 wherein the outer brace portion of each intermediate frame section is readily separable from the main portion of the respective intermediate frame section.

5. The implement according to claim 4 wherein the outer brace portion of each intermediate frame section is connected to the main portion only using threaded fasteners.

6. The implement according to claim 1 wherein each outer frame section is only connected to the respective intermediate frame section through pivotal connection to the respective outer brace portion and wherein the outer brace portion of each intermediate frame section is readily separable from the main portion of the respective intermediate frame section such that the outer frame section is readily separable from the main portion of the respective intermediate frame section together with the outer brace portion.

7. The implement according to claim 1 wherein the outer brace portion of each intermediate frame section comprises an inner frame member and an outer frame member joined at respective rear ends at laterally spaced apart positions on the main portion of the intermediate frame section and extending forwardly to be joined to one another at a forward end of the outer brace portion in the working position, the respective outer frame section being pivotally coupled wholly on the outer frame member.

8. The implement according to claim 7 further comprising a pair of first transport wheels arranged to support the inner ends of the outer frame sections respectively for rolling movement along the ground in the transport position, the first transport wheels being supported wholly on the outer frame member of the outer brace portion of the respective intermediate frame section.

9. The implement according to claim 7 wherein each inner brace member is pivotally coupled at the outer end thereof to the inner frame member of the outer brace portion of the respective intermediate frame section.

10. The implement according to claim 1 wherein the inner end of each inner brace member is pivotally coupled to the main frame section about a respective floating axis which is coaxial with the floating axis of the respective intermediate frame section pivotally coupled to the main frame section.

11. The implement according to claim 1 further comprising a pair of first transport wheels arranged to support the inner ends of the outer frame sections respectively for rolling movement along the ground in the transport position, the first transport wheels being supported forwardly of the respective intermediate rollers in the working position of the intermediate frame sections and the outer frame sections.

12. The implement according to claim 1 further comprises a pair of second transport wheels arranged to support the outer ends of the intermediate frame sections respectively for rolling movement along the ground in the transport position, the second transport wheels being supported rearwardly of the respective outer rollers in the working position of the intermediate frame sections and the outer frame sections.

13. The implement according to claim 1 further comprising a pair of first transport wheels arranged to support the inner ends of the outer frame sections respectively for rolling movement along the ground in the transport position, a pair of second transport wheels arranged to support the outer ends of the intermediate frame sections respectively for rolling movement along the ground in the transport position, and a pair of third transport wheels arranged to support the outer ends of the outer frame sections respectively for rolling movement along the ground in the transport position.

14. The implement according to claim 13 wherein at least one of the pairs of wheels comprises a pair of caster wheels supported on a freely rotatable post, the rotatable post being coupled to the respective frame section by a pair of parallel links for movement between a lowered position for supporting the frame section in the transport position and a raised position so as not to interfere with rolling movement of the intermediate or outer rollers along the ground in the working position, the parallel links being spaced above respective wheels on the rotatable posts so as not to interfere with full rotation of the wheels about an upright castoring axis of the respective rotatable post.

15. The implement according to claim 14 wherein each pair of caster wheels is supported on the rotatable post by a support arm extending radially outwardly from the bottom end of the post and wherein each rotatable post is rotatably received within a respective vertical tube, the parallel links being pivotally coupled to the vertical tube at vertically spaced positions thereon spaced above the support arm.

16. The implement according to claim 15 wherein a bottom end of each vertical tube is spaced below the respective pivot links and is substantially in abutment with the respective support arm.

17. The implement according to claim 15 wherein there is provided a locking slot on a member on the vertical tube and a lock pin supported on each support arm for sliding movement in a radial direction relative to the vertical tube for movement between a locked position engaged within the locking slot to resist relative rotation therebetween and a released position in which the caster wheels are freely rotatable about the respective upright castoring axis.

18. The implement according to claim 13 wherein at least one of the pair of first transport wheels, the pair of second transport wheels, and the pair of third transport wheels comprises a pair of steerable wheel assemblies, each steerable wheel assembly comprising:
 an upright tube which is pivotally coupled at an upper end of the frame section which is supported by the steerable wheel assembly for pivotal movement between a lowered position for supporting the frame section in the transport position and a raised position so as not to interfere with rolling movement of the rollers along the ground in the working position;
 a linkage coupled between the upright tube and the frame section for controlling movement of the upright tube between the lowered and raised positions;
 a rotatable post rotatable received within the upright tube and which is oriented to be rotatable about an upright steering axis in the lowered position of the steerable wheel assembly;
 a support arm extending radially outward from a bottom end of the rotatable post so as to support a dual wheel assembly thereon;
 a steering arm extending radially outward from the rotatable post at a location spaced above the support arm such that a bottom end of the upright tube is substantially abutted with the steering arm; and
 a steering actuator coupled between a mounting portion of the upright tube and the steering arm so as to control rotation of the support arm and steering arm on the rotatable post about the upright steering axis relative to the upright tube.

19. A land roller implement arranged to be towed in a forward working direction by a towing vehicle for flattening and levelling land, the implement comprising:
 a main frame section arranged for connection to the towing vehicle and supporting a main roller thereon;
 a pair of intermediate frame sections, each intermediate frame section spanning longitudinally between an inner end of the intermediate frame section and an outer end of the intermediate frame section and supporting a respective intermediate roller thereon;
  the intermediate frame sections being pivotally coupled at the inner ends of the intermediate frame sections at laterally opposing sides of the main frame section for movement between a working position and a transport position;
  in the working position the intermediate frame sections spanning outwardly in opposing lateral directions towards the outer ends of the intermediate frame sections such that the intermediate rollers are in a trailing relationship with the main roller on the main frame section for rolling movement across the ground in the forward working direction and such that the intermediate frame sections are pivotal relative to the main frame section about respective floating axes of the intermediate frame sections relative to the main section oriented in the forward working direction; and
  in the transport position the intermediate frame sections extending rearwardly from the inner ends of the intermediate frame sections coupled to the main frame section towards the outer ends of the intermediate frame sections;
 a pair of outer frame sections, each outer frame section spanning longitudinally between an inner end of the outer frame section and an outer end of the outer frame section and supporting a respective outer roller thereon;
  the inner ends of the outer frame sections being pivotally coupled on the outer ends of the intermediate frame sections respectively such that the outer frame sections are movable together with the intermediate frame sections between the working position and the transport position;
  in the working position the outer frame sections spanning outwardly in respective ones of the opposing lateral directions towards the outer ends of the outer frame sections such that the outer rollers are in a leading relationship with the intermediate rollers on the intermediate frame sections for rolling movement across the ground in the forward working direction; and in the transport position the outer frame sections extending rearwardly from the inner ends of the outer frame sections towards the outer ends of the outer frame sections;

the intermediate frame sections each comprising a main portion including at least one longitudinal frame member that fully spans longitudinally between the inner and outer ends of the intermediate frame section and that supports the intermediate roller thereon and an outer brace portion extending forwardly from said at least one longitudinal frame member of the main portion;

the outer frame sections being pivotally supported relative to the respective intermediate frame sections solely by connection of the outer frame sections to the outer brace portion at a location forwardly of said at least one longitudinal frame member of the main portion of the respective intermediate frame section such that each outer frame section is pivotal about a respective floating axis that is oriented in the forward working direction in the working position relative to the respective intermediate frame section; and a pair of inner brace members, each inner brace member being coupled to a respective one of the intermediate frame sections at an outer end of the inner brace member to extend forwardly therefrom to an inner end of the inner brace member pivotally coupled to the main frame section in the working position;

wherein in the transport position an overall lateral width of the implement perpendicular to the forward direction is defined by the outer frame sections supported on the outer brace portions of the intermediate frame sections; and wherein the outer brace portion of each intermediate frame section is readily separable from the main portion of the respective intermediate frame section such that i) the respective outer frame section is readily separable from the main portion of the respective intermediate frame section by separation of the outer brace portion that is the sole connection of the outer frame section to the intermediate frame section, and ii) the overall lateral width of the implement is reduced when the outer brace portions are separated from the intermediate frame sections respectively.

\* \* \* \* \*